United States Patent [19]
Kanemitsu

[11] 3,892,866
[45] July 1, 1975

[54] PROCESS FOR THE PREPARATION OF FEED FOR CULTIVATING MACRURA

[75] Inventor: Tsunetoshi Kanemitsu, Tokyo, Japan

[73] Assignee: Taiyo Fishery Co., Ltd., Tokyo, Japan

[22] Filed: Feb. 12, 1973

[21] Appl. No.: 331,585

Related U.S. Application Data

[63] Continuation-in-part of Ser. No. 82,132, Oct. 19, 1970, abandoned.

[30] Foreign Application Priority Data

Oct. 20, 1969 Japan.............................. 44-83243

[52] U.S. Cl. ...................... 426/72; 426/62; 426/74; 426/147; 426/204; 426/212; 426/364; 426/376; 426/805
[51] Int. Cl............................. A23k 1/10; A23k 1/18
[58] Field of Search .............. 426/1, 2, 62, 74, 212, 426/210, 465, 519, 376, 364, 370, 204, 311, 72

[56] References Cited

UNITED STATES PATENTS

| | | | |
|---|---|---|---|
| 1,384,320 | 7/1921 | Hickson et al. | 426/1 |
| 2,358,320 | 9/1944 | Eisaman | 99/3 |
| 3,620,754 | 11/1971 | Kanemitsu et al. | 426/74 |
| 3,671,261 | 6/1972 | Ayukawa et al. | 426/72 |

*Primary Examiner*—Norman Yudkoff
*Assistant Examiner*—Curtis P. Ribando
*Attorney, Agent, or Firm*—Woodcock, Washburn, Kurtz & Mackiewicz

[57] ABSTRACT

A process for the preparation of feed for cultivating macrura which comprises kneading raw meat of aquatic animals with a substance selected from the group consisting of salt and salt-containing material, adding the kneaded material to a compound feed powder, fully kneading the mixture, shaping the kneaded mixture into adequate size and thereafter heating the shaped materials to dryness.

7 Claims, No Drawings

PROCESS FOR THE PREPARATION OF FEED FOR CULTIVATING MACRURA

This application is a continuation-in-part of parent application Ser. No. 82,132 filed Oct. 19, 1970, now abandoned.

The present invention relates to a process for the preparation of solid feed having high binding power.

For the feed for cultivating macrura, little outflow of nutrients and high retentivity of solid form of feed are required.

Macrura, as its habitude, hides in the sand during the daytime and principally takes feed in the nighttime. Macrura is not voracious but bites little by little from one end of the feed so that a long time is required for taking feed. The feeds containing a proper amount of water are more digestible.

The hitherto known feeds are accompanied by the following disadvantages.

1. Because of their low binding power, the nutrients are apt to outflow into water after feeding and before taking
2. Readily absorb water to collapse
3. Indigestible
4. Loss of the nutrients is expensively great
5. Deteriorate the sand bed of the nursery to cause the death from suffocation of the macrura From our numerous studies we have found that an improved feed can be obtained by a process which comprises kneading a compound feed powder (for example a mixed powder of fish meal, wheat flour, soy bean meal, yeast, vitamin-mineral mix and the like) with a paste resulting from kneading of the raw meat of aquatic animals with common salt or a material containing salt, shaping the kneaded material into a suitable size and drying the shaped material with heating.

For the raw meat of the aquatic animals, there may be used fresh meat, either refrigerated or unrefrigerated. In addition, whole fish with bone and internal organs ground, fish meat without head and internal organs, fish meat without bone and skin (otoshi-mi) or bone and skin with a part of residual meat may be employed as the raw material. To this raw material, 1–3% by weight of common salt or in the salt content of a material containing salt is added and kneaded. It is preferable to add 50–150 parts by weight of the salted meat thus obtained to 100 parts by weight of the compound feed powder. If necessary, further water-containing materials such as pasty fish soluble and the like and water in such amount as the water content of the mixture becomes 35–56% are added to said mixture and fully kneaded. This kneaded material is shaped into a suitable size and then dried under heating with hot air of about 100°C for a short time (20–60 minutes).

Common salts can be employed with various ingredients. I prefer to use sodium chloride or salt (mineral) mixture which comprises the following ingredients to produce the balance of nutrition.

| Salt (mineral) mixture | percent |
| --- | --- |
| Calcium lactate | 35 |
| Potassium phosphate, dibasic | 25 |
| Calcium phosphate, dibasic | 15 |
| Magnesium sulfate | 15 |
| Sodium phosphate, dibasic | 10 |

Various ingredients might be employed in the feed powder to be used for macrura feed. I prefer to employ dry ingredients such as fish meal, shrimp meal, wheat flour, vitamins and minerals. A specific feed powder which was compounded contained the following ingredients.

| | percent |
| --- | --- |
| Fish meal | 60 |
| Soybean meal | 20 |
| Wheat flour | 10 |
| Yeast | 7 |
| Mineral mixture | 2.89 |
| Calcium ascorbate | 0.1 |
| a-tocopherol | 0.01 |

According to the present invention when the salted meat is mixed with the compound feed powder and the mixture is heated the structure protein of the meat embraces in its steric net structure the feed powder ingredients so that the improved feed after heat coagulation to dryness does not collapse even if it absorbs water after feeding. Accordingly the elution (outflow) of the nutrients can be inhibited. When salt is added to the raw meat the salt soluble structure protein in the cells leaches out and the meat becomes pasty. Namely, the net structure is effectively strengthened by the addition of salt and the feed ingredients mutually adhere closely on drying so that the water soluble nutrients are fully retained even in water. An excessively high concentration of sodium chloride brings on the denaturation of protein and depreciates the effect of the feed. The desirable amount of sodium chloride to be added is 1–3% to the meat. Instead of the raw meat, if for example, wheat starch, heat coagulating wheat protein or soy bean protein is added to the feed powder or further suitable starchy substance is added and kneaded with water and then heated to dryness the feed thus prepared absorbs water after throwing into water and is able to retain its original shape for some time. However since said feed becomes comparatively porous after the heating process it has disadvantages such as that the retention of water soluble ingredients is insufficient and the effect of the feed is low.

According to the comparative experiments on leaching out of water soluble ingredients between the present feeds and comparative feeds 5 hours after throwing it into water, in the present feed (prepared by the process mentioned above and shown in the example 1) the leaching out of the water soluble ingredients was 17% while in the comparative feed free from the meat (prepared by the same process shown in the example 1, except instead of 100 parts by weight of Alaska pollack meat 15 parts by weight of gluten, 5 parts by weight of Alaska pollack soluble and 80 parts by weight of water used) 55% of whole soluble ingredients leached out. Further according to the cultivation of prawns weighing 2g in average for three months using these feeds, the increase in weight were 10.2g and 7.8g in the cases of the present feed and comparative feed respectively. That is to say, the weight of the prawns cultivated with the comparative feed was only 76% of that cultivated with the present feed. Further, when the comparative feed and the raw meat feed (mixture of refrigerated Alaska pink shrimp, "NIGISU" (*Glossonodon semifasciatus*) and short necked clam) were fed every other week, the increased weight was 9.5% which corresponds to 93% of that in the group cultivated with the present feed. As it is clear from the above last experiment, when the comparative feed is used together with the raw meat feed its effect can be improved but is inferior to the present feed.

The feeds prepared by the process of the present invention go to the bottom after feeding but gradually come afloat with retention of their original shape with lapse of long time which can be easily removed by scooping. In consequence, according to the present invention, not only the deterioration of the sand bed of the nursery by the residual feed as in the hitherto known feeds can advantageously be prevented but also the feeding can be properly regulated by seeing the adequate feeding amount from the amount of the residual (removed) feed.

The present invention will be explained more in detail by way of the following examples.

EXAMPLE 1

100 parts by weight of the paste prepared by kneading with a minced Alaska pollack (ground) together with common salt in the amount corresponding to 1.3% of the weight of the Alaska pollack were added to 100 parts by weight of a compound feed powder which was prepared by mixing 70 parts by weight of fish meal, 15 parts by weight of wheat flour, 10 parts by weight of soy bean meal, 3 parts by weight of yeast and 2 parts by weight of vitamin-mineral mix. The mixture was kneaded for 10 minutes and extruded in the size of 3m/m in diameter and 5m/m in length and dried with hot air of about 100°C for 20 minutes. Water content before and after drying were 45% and 12% respectively. The solid feeds thus obtained were given to 60 prawns weighing 2.0g in average. After 90 days' feeding the average weight of 55 prawns grown increased to 12.2g.

EXAMPLE 2

150 wt. pts. of the paste prepared by kneading for 10 minutes the minced meat of Alaska pollack free from head and internal organs and Alaska pollack internal organs soluble (salt 7.5%, moisture 40%) in the amount of 20% of the weight of Alaska pollack (concentration of salt to the minced meat was 1.5%) were added to 100 wt. pts. of the compound feed powder same as the one shown in example 1 (moisture of the mixture was 51%). From this mixture the solid feeds were prepared by the same manner as shown in the example 1. This solid feeds obtained were given to 60 prawns weighing 4.5g in average. After 90 days' feeding the average weight of 53 prawns grown increased to 14.9g.

EXAMPLE 3

To 100 wt. pts. of the compound feed powder which was prepared by mixing 70 wt. pts. of fish meal, 10 wt. pts. of wheat protein, 15 wt. pts. of soy bean meal, 3 wt. pts. of yeast and 2 wt. pts. of vitamin-mineral mix, 50 wt. pts. of homogenized past containing 50 wt. pts. of Alaska pink shrimp (ground), 50 wt. pts. of sliced short necked clam and 2 wt. pts. of salt, 20 wt. pts. of fish soluble and 10 wt. pts. of water were added and kneaded. This kneaded mixture (moisture 39%) was moulded in the size of 2m/m in diameter and 5m/m in length and dried with hot air of about 100°C for 10 minutes (moisture 11%). This solid feeds obtained were further ground and given to 500 prawns weighing 0.02g in average. After 100 days' feeding the average weight of 420 prawns grown increased to 5.2g.

What I claim is:

1. A process for preparing a dry solid feed for cultivating macrura which comprises shrimp, prawn and lobster which hides at the bottom of the nursery in the sand thereof and which eats food slowly, which feed is resistant to collapse in water and is capable of keeping the water soluble nutrients after feeding, which comprises kneading fresh raw meat of fish, shrimp, or clams with 1–3% by weight of salt selected from the group consisting of sodium chloride, magnesium sulfate, sodium phosphate, potassium phosphate, calcium phosphate and calcium lactate to give an adhesive paste, adding 50–150 parts by weight of the paste to 100 parts by weight of a compound feed powder containing fish meal, soybean meal, wheat flour, yeast and minerals, fully kneading the mixture, shaping the kneaded mixture into adequate size pellets and thereafter heating the shaped materials to dryness.

2. A process according to claim 1 wherein said salt comprises the salt content of a material containing common salt.

3. A process according to claim 1 wherein said compound feed powder contains substantially 70% fish meal, 10% soybean meal, 15% wheat flour, 3% yeast, and 2% vitamins and minerals.

4. A dry solid feed for cultivating macrura which is resistant to collapse in water and is capable of keeping the water-soluble nutrients after feeding, said feed being prepared by thoroughly kneading fresh raw meat of fish, shrimp or clams with 1–3% by weight of salt selected from the group consisting of sodium chloride, magnesium sulfate, sodium phosphate, potassium phosphate, calcium phosphate and calcium lactate to give an adhesive paste, adding 50–150 parts by weight of the paste to 100 parts by weight of a compound feed powder comprising fish meal, soybean meal, wheat flour, yeast and minerals, fully kneading the mixture, shaping the kneaded mixture into adequate size pellets and thereafter heating the shaped material to dryness.

5. A dry solid feed according to claim 4 wherein said salt comprises the salt content of a material containing common salt.

6. A dry solid feed according to claim 4 wherein said compound feed powder contains substantially 70% fish meal, 10% soybean meal, 15% wheat flour, 3% yeast, and 2% minerals and vitamins.

7. A dry solid feed according to claim 4 wherein said compound feed powder contains substantially 70% fish meal, 15% soybean meal, 10% wheat flour, 3% yeast, and 2% minerals.

* * * * *